United States Patent [19]

Akaiwa

[11] Patent Number: 5,109,529
[45] Date of Patent: Apr. 28, 1992

[54] METHOD OF ASSIGNING FREQUENCY CHANNEL IN MOBILE COMMUNICATIONS SYSTEM

[75] Inventor: Yoshihiko Akaiwa, Tokyo, Japan

[73] Assignee: NEC Corporation, Tokyo, Japan

[21] Appl. No.: 245,193

[22] Filed: Sep. 16, 1988

[30] Foreign Application Priority Data

Sep. 16, 1987 [JP] Japan .................. 62-229610

[51] Int. Cl.$^5$ ............................... H04B 17/00
[52] U.S. Cl. ......................... 455/34.1; 455/67.1
[58] Field of Search ............ 455/33, 34, 54, 56, 455/62, 89, 68, 77, 295, 296, 67, 226; 379/58, 63

[56] References Cited

U.S. PATENT DOCUMENTS

| | | | |
|---|---|---|---|
| 4,392,242 | 7/1983 | Kai | 455/34 |
| 4,654,879 | 3/1987 | Goldman | 455/34 |
| 4,672,657 | 6/1987 | Deishowitz | 455/34 |
| 4,736,453 | 5/1988 | Schloemer | 455/33 |
| 4,747,101 | 5/1988 | Akaiwa et al. | 455/34 |
| 4,794,635 | 12/1988 | Hess | 455/33 |

*Primary Examiner*—Curtis Kuntz
*Attorney, Agent, or Firm*—Sughrue, Mion, Zinn, Macpeak & Seas

[57] ABSTRACT

In order to attain a frequency spectrum efficiency by narrowing channel interval without inducing interference from adjacent channels, a signal level of a mobile unit which requests channel access is detected at a land site. The signal level thus detected is used to assign a channel to the incoming mobile unit such that the assigned channel is adjacent to a channel whose signal level is closest to the signal level of the assigned channel. Further, in order to meet magnitude changes of received signals, the magnitudes are checked so as to reassign currently allocated channels.

6 Claims, 4 Drawing Sheets

METHOD OF ASSIGNING FREQUENCY CHANNEL IN MOBILE COMMUNICATIONS SYSTEM

BACKGROUND OF THE INVENTION

1. Field of the Invention

This invention relates generally to a method of assigning a frequency channel to a mobile unit in a mobile communications system, and more specifically to such a method which features effective reduction of interchannel interference with the result of efficient use of frequency spectrum. Further, this invention relates to a method of reassigning frequency channels currently allocated to a plurality of mobile units.

2. Description of the Prior Art

A mobile communications system including mobile-telephone services, has adopted a so-called multichannel access technique wherein when a mobile unit within a given cell requests channel access or a land site wishes to initially access a mobile unit, one is selected from a plurality of channels and is assigned to the mobile unit. According to a known technique, such a channel is randomly selected in response to each call requirement. Consequently, the conventional technique requires a sufficiently wide channel interval in order to prevent interference from adjacent channels.

With the increasing number of subscribers, the demand for narrowing the channel interval to accommodate more channels within a limited spectrum has increased markedly. However, the above-mentioned random channel selection inherently requires a large channel space and hence is unable to meet this requirement.

SUMMARY OF THE INVENTION

It is an object of this invention to provide a method of assigning a channel to a mobile unit which originates a call in a manner to prevent interference from adjacent channels.

Another object of this invention is to provide a method of reassigning the currently allocated frequency channels in order to prevent interference from adjacent channels.

One aspect of this invention takes the form of a method of assigning a channel to a mobile unit at a land site of a mobile communications system wherein the land site communicates with a plurality of mobile units through a plurality of channels, comprising the steps of: (a) receiving at the land site a signal from a first mobile unit to which a channel is to be assigned; (b) determining a signal level received at step (a); (c) determining location of the signal level among signal levels from second mobile units which are communicating with the land site; and (d) assigning a channel to the first mobile unit in a manner that the assigned channel is adjacent to a channel whose signal level is close to the signal level of the first mobile unit.

Another aspect of this invention takes the form of a mobile unit at a land site of a mobile communications system wherein the land site communicates with a plurality of mobile units through a plurality of channels, comprising the steps of: (a) determining signal levels of the channels which are currently used to communicate mobile units with the land site; (b) determining difference of the signal levels between adjacent channels; and (c) performing reassignment if the difference between any two adjacent channels exceeds a predetermined magnitude.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 1:
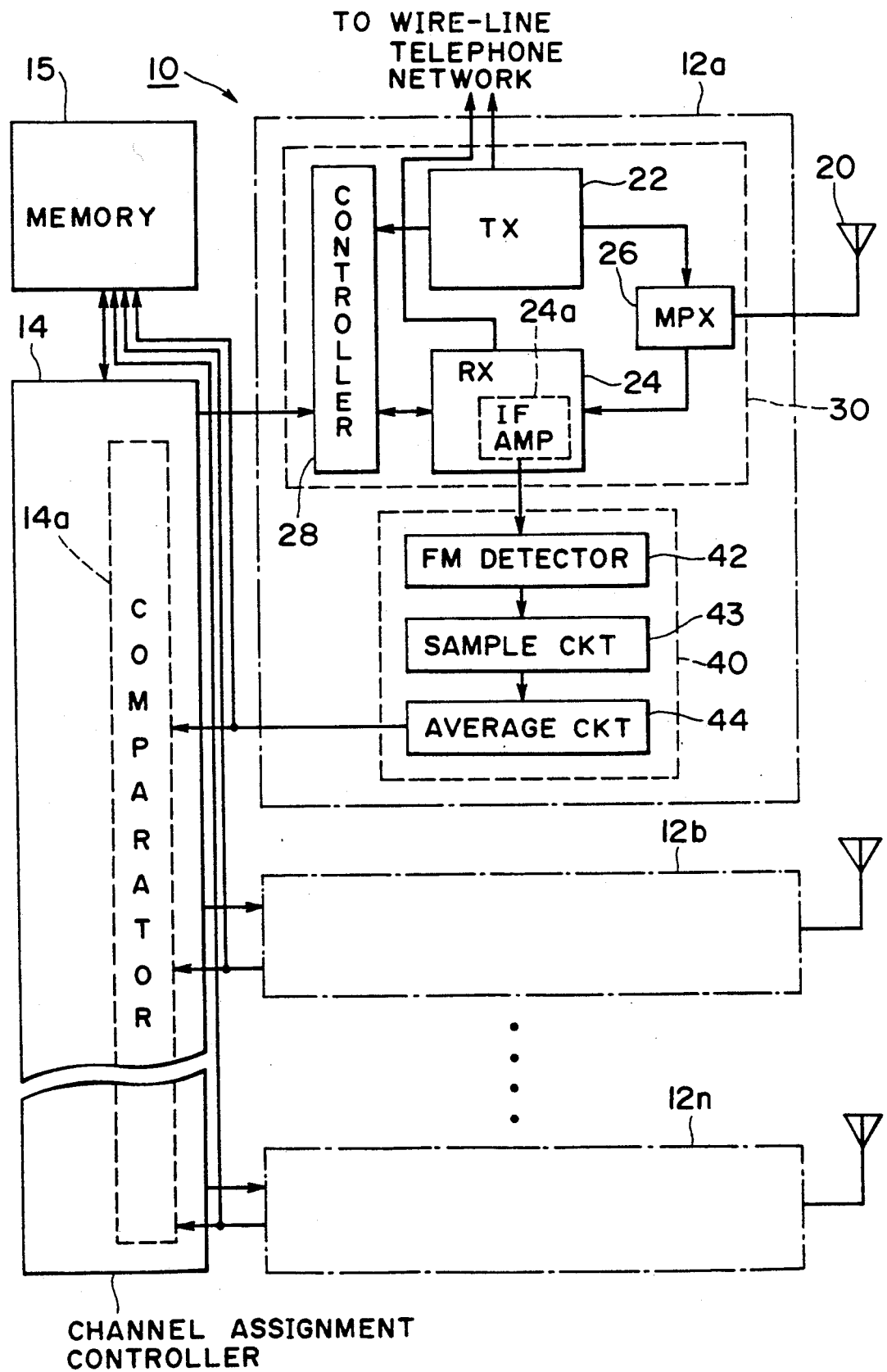
FIG. 1 is a block diagram showing a land site of the nature used in the present invention.

Reference is now made to FIG. 1, wherein a land site 10 is shown in block diagram form only for the purposes of illustrating this invention. The land site 10 includes a plurality of channel blocks 12a, 12b, ..., 12n, a channel assignment controller 14, and a memory 15. The arrangement of each of the channel blocks 12a, 12b, ..., 12n is identical with each other and hence the arrangement of the block 12a is only shown in detail.

The channel block 12a includes a transmitter (TX) 22 and a receiver (RX) 24, both of which are coupled to an antenna 20 through a multiplexer 26 and also are coupled to a call controller 28. Further, the transmitter 22 and the receiver 24 are coupled to a wire-line telephone network (not shown). The arrangement enclosed by a broken line 30, is well known in the art and hence further descriptions thereof will be omitted for clarity.

The method of this invention is directly concerned with an arrangement which comprises the controller 14, the memory 15 and a signal level detector 40. The memory 15 stores the signal levels detected by the detector 40, and may be used to store the order of signal levels determined by the channel assignment controller 14.

In the FIG. 1 arrangement, the signal level detector 40 comprises a FM detector 42, a sample circuit 43 and an average circuit 44. The FM detector 42 is coupled to an IF (Intermediate Frequency) amplifier 24a forming part of the receiver 24, and receives therefrom an IF signal of an incoming signal (FM signal) transmitted from a mobile unit and received at the antenna 20. The FM detector 42 generates modulating signal envelope. The sample circuit 43 samples the envelope at a time interval T0. The sampled signal levels from the circuit 43 is then applied to the average circuit 44 wherein the sampled signals are averaged at a time interval T1 (T1 is greater than T0).

The average circuit 44 applies its output, as a detected signal level, to a comparator 14a and also to the memory 15. The comparator 14a forms part of the channel assignment controller 14. The comparator 14a functions to determine the order of the signal levels received through corresponding channels. The channel assignment controller 14 determines which channel is appropriate for the mobile unit to which new channel should be assigned. Further, the channel assignment controller 14 determines reassignment or rearrangement of the previously allocated and currently used channels to meet changes in received signal levels.

According to this invention, in order to reduce interchannel interference, channel allocation is performed such that the received signals with a large difference level are not permitted to occur in adjacent channels. The reason why such channel assignment is able to reduce interchannel interference will be discussed with reference to FIG. 2.

Figure 2:
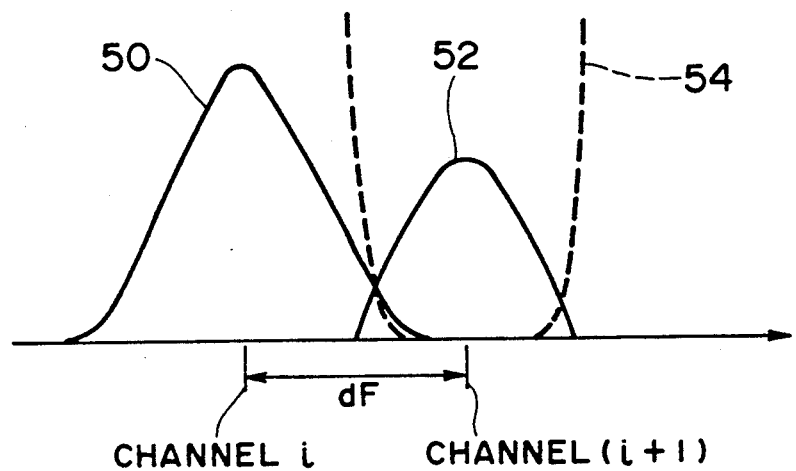
FIG. 2 is a graph showing spectrum of two channels expressed on frequency scale.

In FIG. 2, two frequency spectrums 50, 52 of the signals transmitted over two adjacent channels i and (i+1) are shown together with filter characteristics 54 of a band-pass filter provided for the channel (i+1). FM signal, commonly used in a mobile communications system, has a spectrum which theoretically extends to infinite. Therefore, there exists signal spectrum of the channel i which pass through the band-pass filter of the channel (i+1). Electric power leaked into an adjacent channel through a band-pass filter produces an amount of interference. This amount of interference depends on the following parameters: a channel interval (dF), spectrum of an incoming FM signal, filtering characteristics of a band-pass filter provided for each channel, and a signal level of an interfering wave.

It is understood that interchannel interference is low when (a) spectrum width of an incoming FM signal is narrow, (b) a channel interval is large, (c) a pass range of a bass-pass filter is narrow and cutoff characteristics of the filter is sharp, and (e) an interfering signal level is low. The parameters referred to in the above-mentioned items (a) and (b) are determined depending on what kind of modulation is adopted in a communications system, so that the values of these two parameters are determined at the system design.

According to this invention, the parameters of channel interval and interfering signal level are considered. It should be noted that the interfering level itself is not significant but a ratio of an interfered (viz., desired) signal level and the aforesaid amount of interference is important. The signals transmitted from a plurality of mobile units and received by a land site are different in their levels, and, it is often the case that a ratio of maximum and minimum signal levels reaches more than 70 dB. Consequently, if the signals having large different levels are assigned to adjacent channels, a signal with a small level is contaminated by the adjacent strong signal. Therefore, this invention controls assignment of a channel to a mobile unit which requests a call in a manner which obviates this contamination. Further, as mobile units change their locations, the signal levels received at the land site change accordingly. To solve the problem due to this signal strength change received at a land site, this invention changes the allocation of channels currently in use at an appropriate time interval (for example). This invention will further be discussed in detail with reference to FIGS. 3, 4, 5 and 6.

Figure 3:
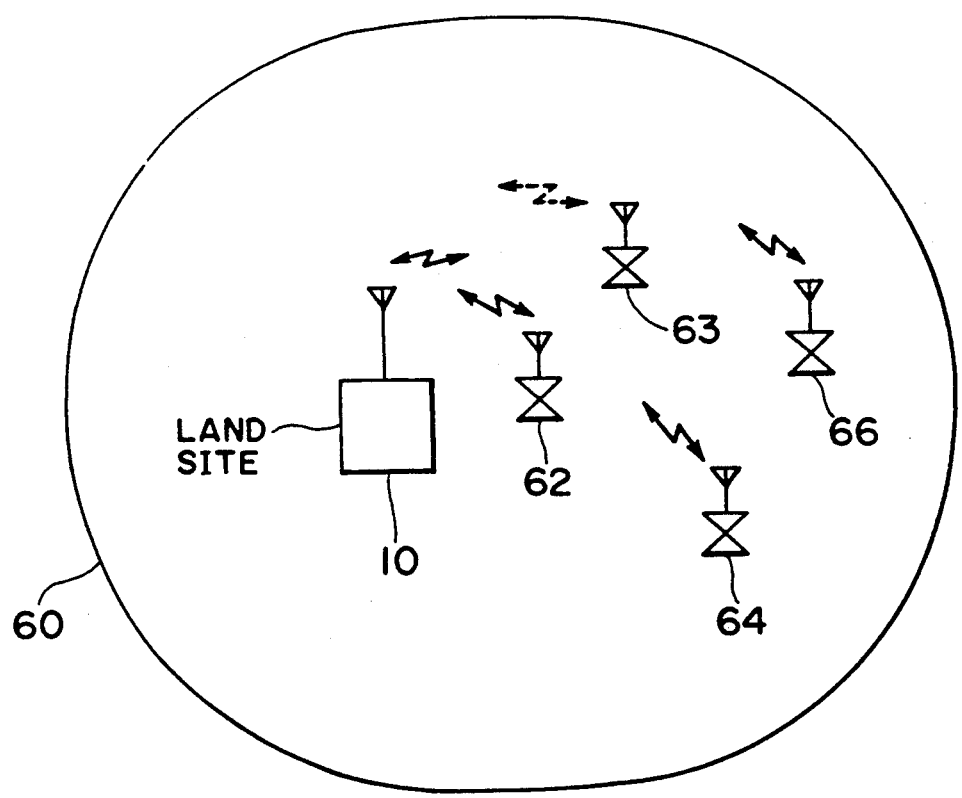
FIG. 3 is a sketch showing a service cell wherein one land site is arranged to communicate with a plurality of mobile units through a plurality of channels.
Figure 4:
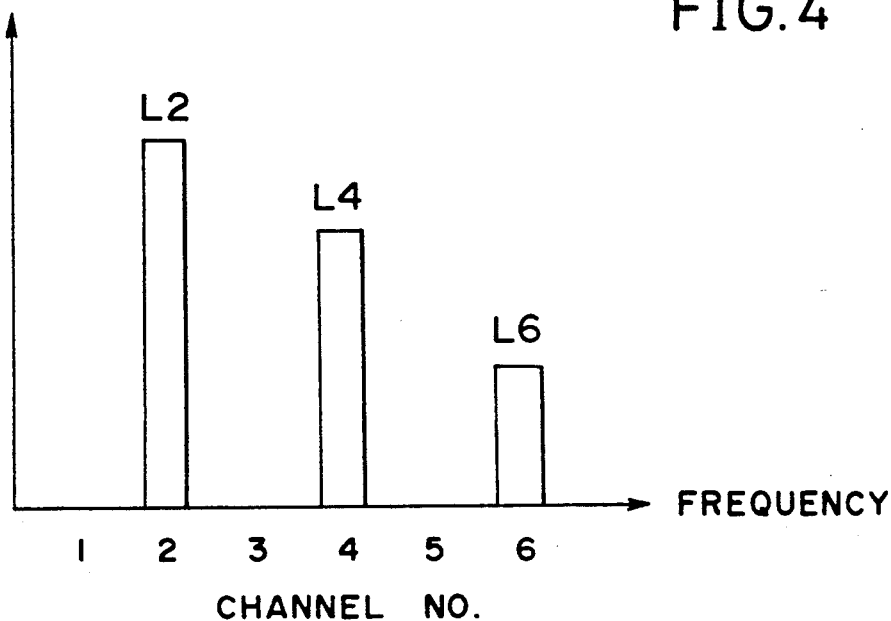
FIGS. 4, 5 and 6 are graphs each showing signal levels received at a land site in terms of channels.
Figure 5:
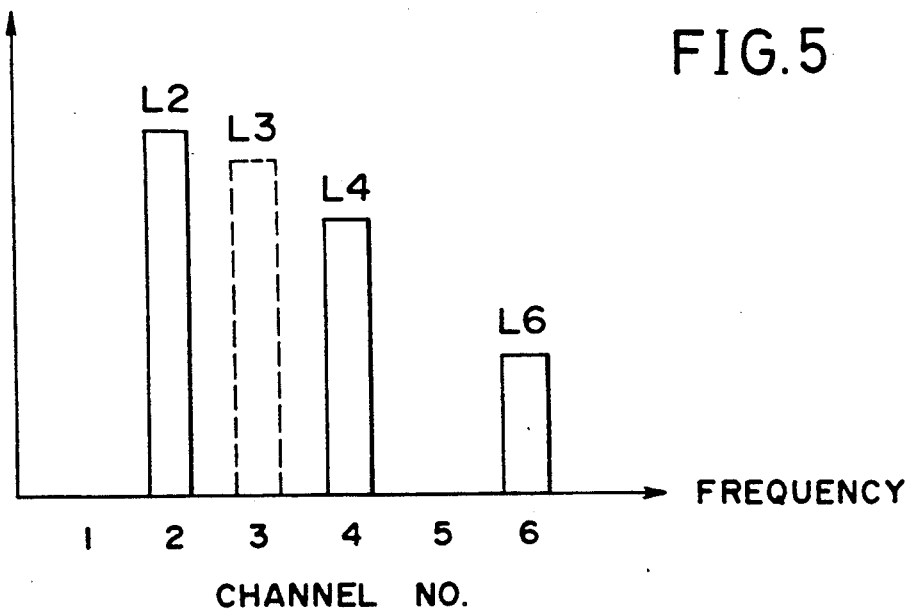

FIG. 3 shows a cell service area 60 which includes the land site 10 (FIG. 1) and four mobile units 62, 63, 64 and 66 in this case, while FIG. 4 shows signal levels received at the land site in terms of six channels 1 through 6. For the sake of convenience, the received signal levels of the channels 1, 2, 3, 4, 5 and 6 are respectively represented L1, L2, L3, L4, L5 and L6. It is assumed that (a) the mobile units 62, 64 and 66 are in communication with the land site 10 via the channels 2, 4 and 6, respectively, and (b) the mobile unit 63 requires a channel to be assigned. The received signal levels of the channels 2, 4 and 6 are shown in FIG. 4 (viz., L6<L4<L2). It is assumed that the received signal level of the mobile unit 63 is detected between those of the channels 2 and 4, then the channel 3 is assigned to the mobile unit 63. FIG. 5 shows the received signal level of the unit 63 by a broken line at the channel 3.

Figure 6:
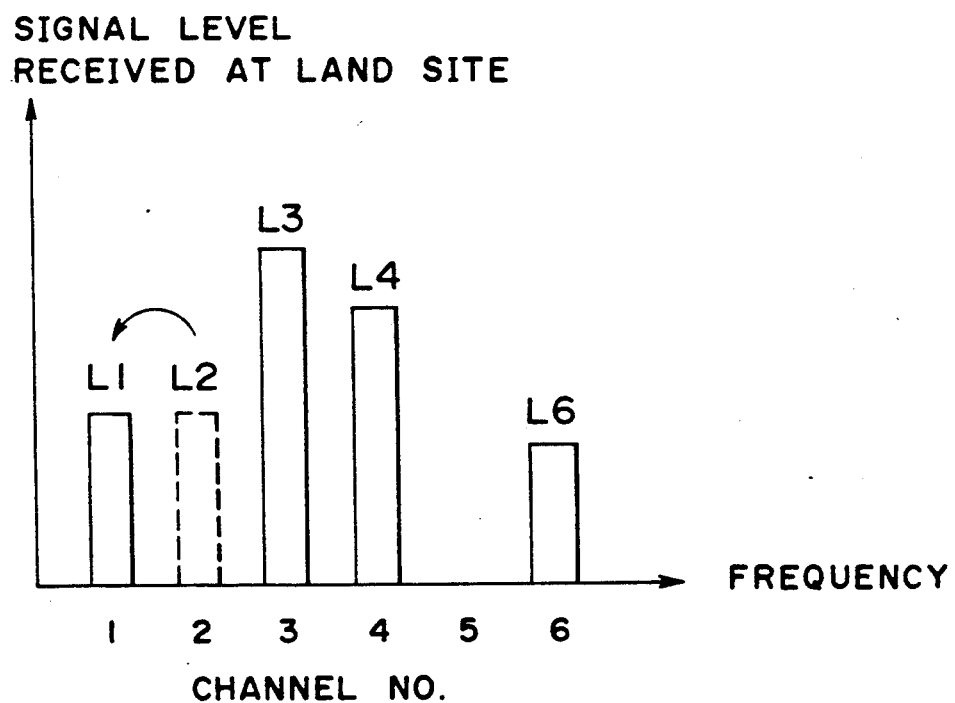

On the other hand, let us consider the case where the received signal levels changes as the units moves while the member of mobile units communicating with the land site remains unchanged. It is assumed that only L2 changes lower than L3 as shown in FIG. 6, then the signal of the channel 3 interferes with the channel 2. Therefore, the mobile unit 62, which presently use channel 2, is forced to change to channel 1 as shown. Such channel changes may be carried out, for example, by periodic examination of each of the mobile unit signals. This reassignment of channels can be carried out upon the level of any two adjacent channels reaching and/or exceeding an predetermined magnitude.

In FIG. 1, the memory 15 may be omitted wherein all the channel blocks 12a, 12b, ..., 12n continue to generate the outputs therefrom.

In the above discussion, if there is a group of unused channels which are continuously positioned on a frequency axis, channels may automatically be assigned every other channel in response to request of channel assignment from mobile units. In this case, each channel is isolated and hence there is no difficulty of interference from adjacent channels. Alternatively, it is possible to assign the call to every second and third channel. When such interval channel assignment is employed, after the well spaced channels are all in use, the present invention then locates the next incoming call next to a channel having the closest level thereto.

It should be noted that the circuit arrangements of the signal level detector 40 and the channel assignment controller 14 are illustrated only by way example. The average circuit 44 may be replaced with a center value detector which picks up each center value during the time interval T1 of the sampled signals.

The foregoing description shows only preferred embodiments of the present invention. Various modifications are apparent to those skilled in the art without departing from the scope of this invention which is only limited by the appended claims.

What is claimed is:

1. A method of assigning a channel to a mobile unit at a land site of a mobile communications system wherein said land site communicates with a plurality of mobile units through a plurality of channels, comprising the steps of:
    (a) receiving at said land site a first signal from a first mobile unit which requires channel access;
    (b) obtaining a signal level of said first signal;
    (c) comparing the signal level of said first signal with the signal levels of other channels which have been detected at said land site and stored in a memory means provided therein; and
    (d) assigning a channel to said first mobile unit in a manner that the assigned channel is adjacent to a channel whose signal level is closest to the signal level of said first signal.

2. A method of reassigning at least one channel to a mobile unit at a land site of a mobile communications system wherein said land site communicates with a plurality of mobile units through a plurality of channels, comprising the steps of:
    (a) detecting signal levels of the channels which are currently used to communicate mobile units with said land site;

(b) detecting a difference between the signal levels of two adjacent channels; and
(c) reassigning, if the difference between the signal levels of said two adjacent channels exceeds a predetermined magnitude, a channel to a mobile unit using one of said two adjacent channels in a manner that the reassigned channel is adjacent to a channel whose signal level is closest to the signal level of said one of said two adjacent channels.

3. A method as claimed in claim 2, wherein said signal levels in step (a) are previously stored in a memory provided in said land site.

4. A method of assigning a channel to a mobile unit at a land site of a mobile communications system wherein said land site communicates with a plurality of mobile units through a plurality of channels, comprising the steps of:
(a) receiving at said land site a first signal from a first mobile unit which requires channel access;
(b) obtaining a signal level of said first signal;
(c) obtaining a difference between the signal level of said first signal and each of other channels signal levels which have been detected at said land site and stored in a memory means provided therein; and
(d) assigning a channel to said first mobile unit in a manner that the assigned channel is adjacent to a channel whose signal level equals the signal level of said first signal or differs therefrom by less than a predetermined value.

5. A method of reassigning at least one channel to a mobile unit at a land site of a mobile communications system wherein said land site communicates with a plurality of mobile units through a plurality of channels, comprising the steps of:
(a) detecting signal levels of the channels which are currently used to communicate mobile units with said land site;
(b) detecting a difference the signal levels of two adjacent channels; and
(c) reassigning, if the difference between the signal levels of said two adjacent channels exceeds a predetermined magnitude, a channel to a mobile unit using one of said two adjacent channels in a manner that the reassigned channel is adjacent to a channel whose signal level equals the signal level of said one of said two adjacent channels or differs therefrom by less than a predetermined value.

6. A method of assigning a channel to a mobile unit at a land site of a mobile communications system wherein said land site communicates with a plurality of mobile units through a plurality of channels, comprising the steps of:
(a) receiving at said land site a first signal from a first mobile unit which requires channel access;
(b) obtaining a signal level of said first signal;
(c) obtaining a difference between the signal level of said first signal and the signal level of each of other channels which have been detected at said land site; and
(d) assigning a channel to said first mobile unit in a manner that the assigned channel is adjacent to a channel whose signal level equals the signal level of said first signal or differs therefrom by less than a predetermined value.

* * * * *